(12) United States Patent
Lindström

(10) Patent No.: US 6,198,068 B1
(45) Date of Patent: Mar. 6, 2001

(54) METHOD FOR PLASMA BRAZING

(75) Inventor: Johan Lindström, Stockholm (SE)

(73) Assignee: AGA AB, Lidingo (SE)

( * ) Notice: Subject to any disclaimer, the term of this patent is extended or adjusted under 35 U.S.C. 154(b) by 0 days.

(21) Appl. No.: 09/297,995

(22) PCT Filed: Nov. 7, 1997

(86) PCT No.: PCT/SE97/01868

§ 371 Date: Jun. 7, 1999

§ 102(e) Date: Jun. 7, 1999

(87) PCT Pub. No.: WO98/21000

PCT Pub. Date: May 22, 1998

(30) Foreign Application Priority Data

Nov. 13, 1996 (SE) .................................................. 9604147

(51) Int. Cl.$^7$ .................................................. B23K 10/00
(52) U.S. Cl. .............................. 219/121.46; 219/121.45; 219/121.59; 219/76.16
(58) Field of Search ........................ 219/121.45, 121.46, 219/121.59, 76.16, 76.15, 75, 121.37, 121.38, 121.55

(56) References Cited

U.S. PATENT DOCUMENTS

| | | | |
|---|---|---|---|
| 4,058,698 | 11/1977 | Bykhovsky et al. . | |
| 4,081,656 | * 3/1978 | Brown | 219/121.45 |
| 4,152,571 | 5/1979 | Shimada et al. . | |
| 4,921,157 | * 5/1990 | Dishon et al. | 228/124 |
| 5,820,939 | * 10/1998 | Popoola et al. | 219/76.14 |

FOREIGN PATENT DOCUMENTS 417 595 A1 9/1990 (EP) .

* cited by examiner

Primary Examiner—Mark Paschall
(74) Attorney, Agent, or Firm—Pearne & Gordon LLP

(57) ABSTRACT

A method of brazing, with the use of a plasma forming device (1) having a non-consumable electrode (2), comprises the following steps of operation. A first gas is supplied to said plasma forming device (1). A plasma flow is formed of said first gas by applying a voltage between said electrode (2) and an electrical terminal (7). The plasma flow is directed towards a work piece (7). Braze material (10) to be melted by said plasma flow is provided. Furthermore, a second gas may be supplied for shielding said plasma flow from the surrounding atmosphere. At least one of said first and second gas comprises a principal inert component including at least argon and in a minor amount an active component.

18 Claims, 2 Drawing Sheets

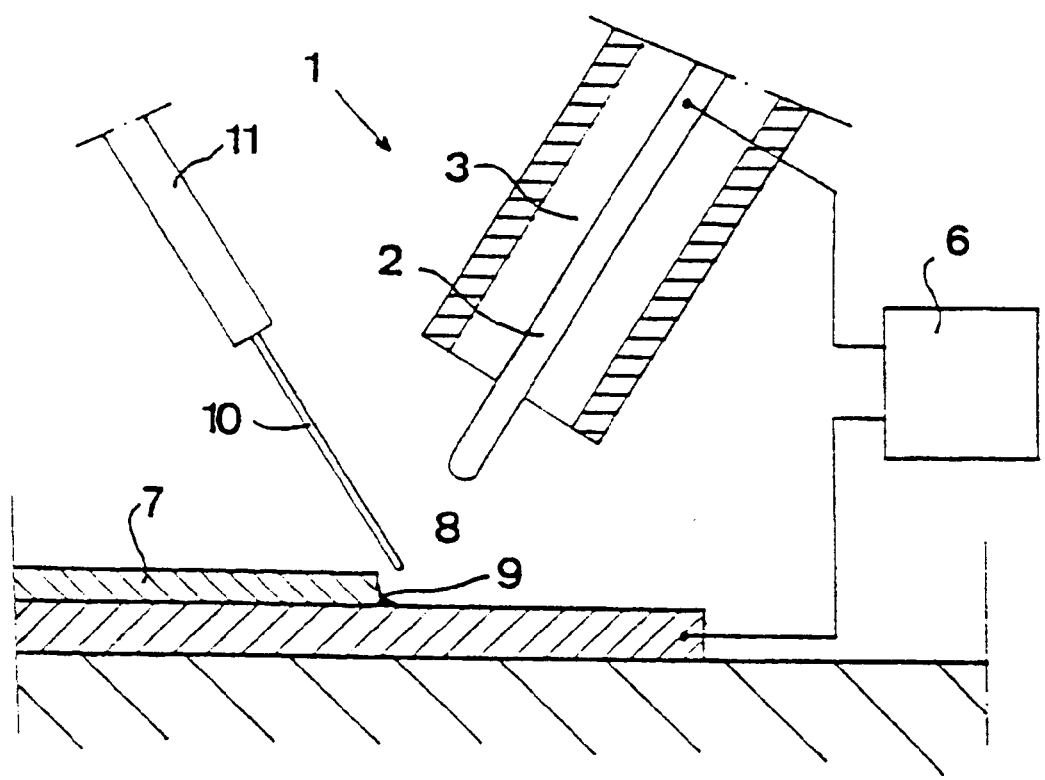

METHOD FOR PLASMA BRAZING

It is also known to braze such joints using a copper-rich alloy of bronze filler wire. Performed correctly such brazed joints also offer structural enhancement.

Conventional brazing practice in these situations is to use either gas or GMA-brazing techniques. Gas brazing is comparatively slow due to the low temperature of the gas flame. As a consequence of slow brazing speeds, heat input to the joint area is high with a distinct propensity for joint and panel distortion. Furthermore, to activate joint metal and achieve good wetting of the base metal, an aggressive flux is necessary. Moreover, gas brazing causes problems due to the corrosive flux residue and the need for its subsequent removal. Consequently, for reasons of higher brazing speeds and the avoidance of corrosive fluxes, GMA-brazing has been adopted by many car manufacturers. Whilst offering the aforementioned advantages, this process, however, causes other problems. These include a rapid freezing rate which tends to cause microporosity, spatter adhesion to zinc panels with resultant localized damage to the panels and humped braze beads requiring excessive dressing.

SUMMARY OF THE INVENTION

The object of the present invention is to provide a new brazing method by which a braze seam of cosmetic appearance may be obtained. Moreover, the brazing method should permit a high brazing speed.

This object is obtained by means of the method defined in claim 1. By supplying a first gas comprising a principal inert component including at least argon and in a minor amount an active component, it is possible to reduce the number of spatter particles in the area of the braze seam. Moreover, the addition of an active component improves the wetting, resulting in a braze seam having a smooth and uniform shape and demonstrating a low microporosity. Consequently, the braze seam produced requires a minimum of finishing work, and such work required may be performed by means of soft methods, such as fine grinding, polishing etc. A good wetting also enables a high deposition rate and thus a high productivity. Furthermore, due to the relatively low temperature, in comparison with MIG-welding, the brazing process will not negatively affect the material of the work piece. A thin surface layer will be maintained.

The object is also obtained by the method defined in claim 4. In a corresponding manner, by supplying a shielding gas comprising a principal inert component including at least argon and in a minor amount an active component, wetting properties may be improved and the amount of spatter reduced.

According to an embodiment of the present invention, said principal inert component includes a gas mixture of argon and helium. By adding helium the heat transfer is improved, resulting in a higher brazing speed. Preferably, said gas mixture comprises 30 to 90% by volume of helium and 10 to 70% by volume of argon. According to a further example said gas mixture may comprise 55 to 65% by volume of helium and 35 to 45% by volume of argon.

According to a further embodiment of the present invention, said active component includes at least one gas having an oxidizing effect. Such an active component stabilizes the arc, which is an important precondition for a uniform braze seam having a smooth and cosmetic appearance. Thereby, said active component may include at least one of $NO$, $CO_2$, $CO$, $O_2$, $N_2O$, $H_2$ and $N_2$. Moreover, the concentration of said active component may at most be 1% by volume, preferably 0.001% by volume to 0.5% by volume. In the case that the active component includes NO, the concentration of NO may be 0.001% by volume to 0.05% by volume.

According to a further embodiment of the present invention, said braze material comprises as the principal component Cu and a minor amount of Al, Si, Sn or mixtures thereof.

According to a further embodiment of the present invention, the work piece comprises at least two parts to be joined together by the material from the electrode. The work piece may comprise a metal substrate having a thin coating surface layer comprising at least one of the elements zinc and aluminium. Such coating surface layer may comprise a primer containing zinc or aluminium. By means of the inventive method such primer layer need not to be removed before brazing. It is also possible to keep the development of fume and dense fume on a low level, even if such surface layer has not been removed. Moreover, the inventive method reduces the build-up of dirt on the arc-forming device. Alternatively, the thin surface layer may be a metallic layer having a thickness of less than 30 $\mu$m, in particular less than 10 $\mu$m. The inventive method reduces the zinc loss in the proximity of the braze seam. Due to the low number of spatter particles localized damage to the surface layer of the work pieces may be avoided.

BRIEF DESCRIPTION OF THE DRAWINGS

The present invention will now be explained in more detail in connection with the description of different embodiments thereof and with reference to the accompanying drawings.

FIG. 3 discloses schematically a device according to a third embodiment for carrying out the method of the present invention.

DETAILED DESCRIPTION OF DIFFERENT EMBODIMENTS OF THE PRESENT INVENTION

Figure 1:
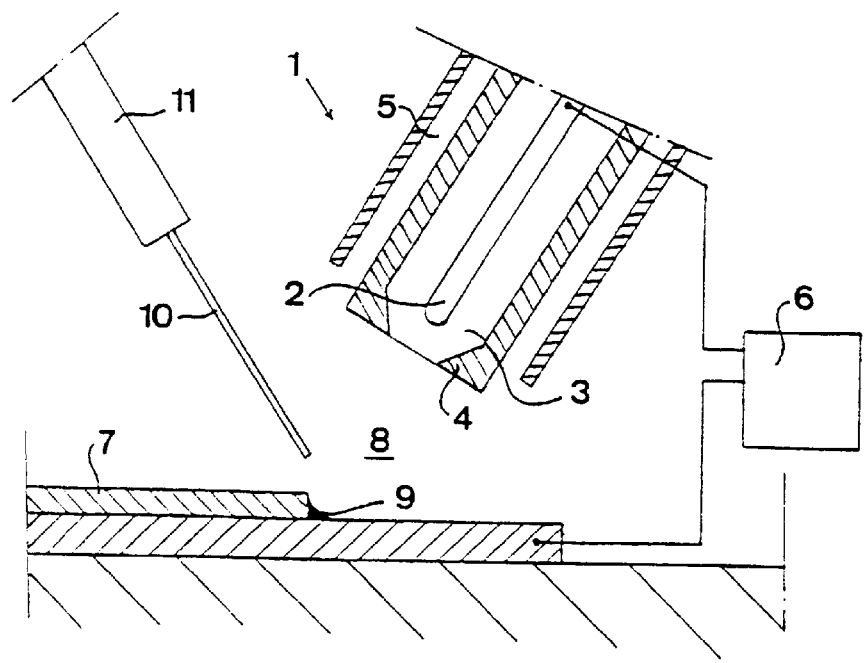
FIG. 1 discloses schematically a device according to a first embodiment for carrying out the method of the present invention.

FIG. 1 discloses a first embodiment of a brazing device comprising a plasma forming device 1 having a non-consumable, tungsten electrode 2 concentrically arranged in a first nozzle channel 3 for a plasma gas. The first nozzle channel 3 is provided with a constricted nose portion 4 and is surrounded by a second nozzle channel 5 for a shielding gas. The plasma gas is supplied from a source in the form of a gas container (not disclosed) to the first gas channel 3 to form a gas flow therethrough. In a similar manner, the shielding gas is supplied from a source in the form of a gas container (not disclosed) to the second gas channel 5 to form a gas flow therethrough. The plasma forming device 1 or torch, disclosed in FIG. 1, is adapted for the performance of plasma arc brazing. A voltage is applied by means of a power supply 6 to the plasma forming device 1 across the electrode 2 and a work piece 7 comprising two metal plates to be brazed together. Because of the voltage applied, an arc appears between the electrode 2 and the work piece 7, forming a plasma of the gas flowing through the first nozzle channel 3. The plasma flow is directed towards the work piece plates 7 to be brazed together. Due to the constricted nose portion 4, leaving a relatively small orifice of the first nozzle channel 3, the plasma flow is constricted and squeezed out of the first nozzle channel 3. Thus, the heat is concentrated to a relatively narrow plasma flow. The shielding gas from the second nozzle channel 5 surrounds the plasma flow and a working area 8 around a braze seam 9. Brazing material 10 is supplied to the working area 8 by means of a braze feeder, schematically indicated at 11. As an alternative, braze material may be applied to the work piece in advance.

Figure 2:
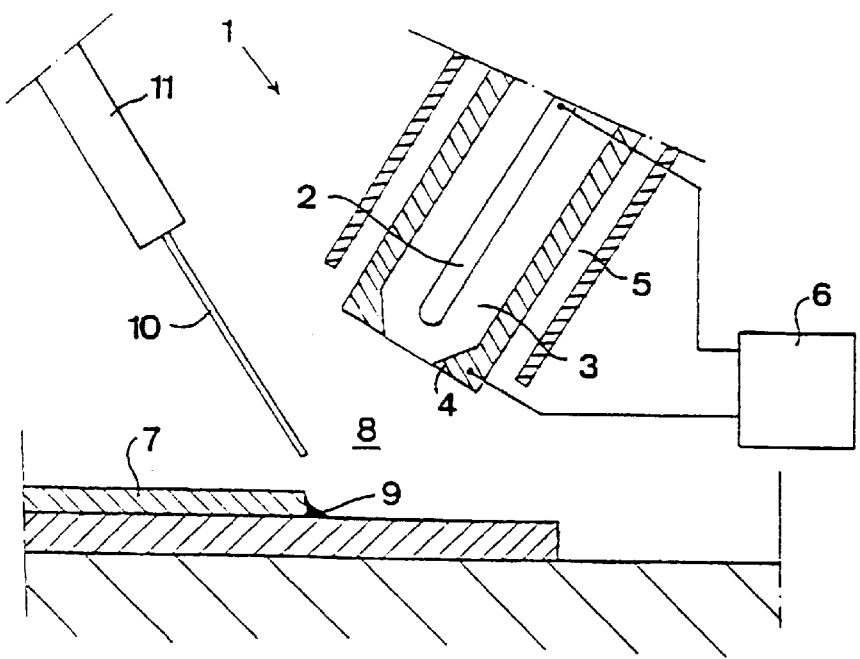
FIG. 2 discloses schematically a device according to a second embodiment for carrying out the method of the present invention.

FIG. 2 discloses a second embodiment of a plasma forming device 1 according to the present invention. It should be noted, that elements having a corresponding function have been provided with the same reference signs in all embodiments disclosed. The second embodiment differs from the first one in that the voltage is applied to the plasma forming device 1 over the non-consumable electrode 2 and the wall of the first nozzle channel 3. Consequently an arc is formed between the electrode and the nose portion 4.

It should be noted, that it may be dispensed with the second nozzle channels 5 in the plasma forming devices disclosed in FIGS. 1 and 2. Thereby, only the plasma gas is delivered.

FIG. 3 discloses a third embodiment of a plasma forming device 1 according to the present invention and having merely one nozzle channel 3. In this embodiment, the nose portion 4 is not constricted, resulting in a less concentrated plasma flow and a reduced concentration of the heat to be transferred to the work piece 7. In this embodiment, the gas supplied to the nozzle channel 3 is both plasma gas and shielding gas.

It should be noted that the braze feeder 11 may be arranged as a part of the plasma forming device 1, and thus to feed braze material 10 from the outer periphery of the plasma forming device, through the second nozzle channel 5 or through the first nozzle channel 3.

The performance of the method according to the present invention will now be explained with reference to the brazing devices disclosed in FIGS. 1 to 3. By means of the power supply 6 an essentially constant arc voltage is provided forming an arc between the electrode 2 and the work piece 7 or between the electrode 2 and the nose portion 4. The arc produces a plasma of the gas flowing through the nozzle channel 3 towards the work piece 7. Braze material 10 is fed into the plasma flow and is successively melted by the heat of the plasma. The braze material melted is then transferred to the work piece 7, thereby forming the braze seam 9 joining the two plates of the work piece 7.

The braze material 10 is in the form of a wire comprising as its principal component Cu, e.g. 80–99%, and a minor amount of aluminium, silicon, tin or mixtures of these elements.

The work piece 7 in the examples disclosed comprises two plates to be brazed together. The plates are relatively thin metal substrate plates, e.g. steel plates having a thickness of less than 4 mm, for example 1, 2 or 3 mm. The substrate plates may be covered by a thin coating surface layer having a thickness of less than 25 $\mu$m and in particular of less than about 10 $\mu$m. The coating surface layer may be a protective thin metallic surface layer, e.g. a layer of zinc, aluminium or a mixture of zinc and aluminium. Such common zinc layers may, for instance, be one or more of a hot dipped galvanised layer, electroplated zinc and galvaneal. The coating surface layer may also be a protective primer containing zinc or aluminium. Such a primer is frequently used to protect the steel plates in car industry during transportation thereof.

The gases supplied through the nozzle channels 3 and 5 comprise a principal inert component including at least argon and in a minor amount an active component. The principal inert component includes a gas mixture having 30 to 90% by volume of helium and 10 to 70% by volume of argon. Preferably, the gas mixture comprises 55 to 65% by volume of helium and 35 to 45% by volume of argon. The active component includes at least one gas having an oxidizing effect, for instance at least one of NO, $CO_2$, CO, $O_2$, and $N_2O$. The active component may also include at least one of $H_2$, and $N_2$. Moreover, it should be mentioned that the active component may include mixtures of two or more of these active components. The concentration of the active component is at most about 1% by volume. Preferably the concentration of the active component is relatively low, for instance from 0.001% by volume to 0.5% by volume. In the case that the active component comprises NO, the concentration of NO may be from 0.001% by volume to 0.05% by volume. It should be pointed out, that the gases defined above may be used as shielding gas and plasma gas as well. Thus the gas supplied through both the nozzle channels 3 and 5 may be the same gas. It is also possible to use different gases, i.e. gases having different compositions, as plasma gas and shielding gas, respectively.

The present invention is not limited to the different embodiments disclosed above but may be varied and modified within the scope of the following claims. The inventive method may be performed together with a wide variety of different brazing devices and certainly not only together with the brazing device described above. Moreover, the inventive method is suitable for brazing together all metallic materials. Although, it may be applied to join thick metal plates, the invention is particularly advantageous for thin metal plates being less resistant to such high temperatures that exist during conventional MIG-welding. The method according to the present invention is suitable to be performed in a manual, semi-automatic or automatic manner.

What is claimed is:

1. A method of brazing with the use of a plasma forming device (1) having a non-consumable electrode (2), comprising the following steps of operation:
   supplying a first gas to said plasma forming device (1);
   forming a plasma flow of said first gas by applying a voltage between said electrode (2) and an electrical terminal (4,7);
   directing said plasma flow towards a work piece (7); and
   providing a braze material (10) to be melted by said plasma flow, characterized in that said first gas comprises a principal inert component including at least argon and in a minor amount an active component.

2. A method according to claim 1, characterized by supplying a second gas and thereby shielding said plasma flow from the surrounding atmosphere.

3. A method according to claim 2, characterized in that said second gas comprises a principal inert component including at least argon and in a minor amount an active component.

4. A method according to claim 1, characterized in that said active component includes at least one gas having an oxidizing effect.

5. A method according to claim 1, characterized in that said active component includes at least one of NO, $CO_2$, CO, $O_2$, $N_2O$, $H_2$, and $N_2$.

6. A method according to claim 1, characterized in that the concentration of said active component is at most 1% by volume, preferably from 0.001% by volume to 0.5% by volume.

7. A method according to claim 1, characterized in that said active component includes NO and that the concentration of NO is from 0.001% by volume to 0.05% by volume.

8. A method according to claim 1, characterized in that said braze material (10) comprises as the principal component Cu and a minor amount of Al, Si, Sn or mixtures thereof.

9. A method according to claim 1, characterized in that the work piece (7) comprises at least two parts to be joined together by the braze material (10).

10. A method according to claim 1, characterized in that the work piece (7) comprises a metal substrate having a thin coating surface layer comprising at least one of the elements zinc and aluminum.

11. A method according to claim 10, characterized in that the thin surface layer is a metallic layer having a thickness of less than 25 $\mu$m, in particular less than 10 $\mu$m.

12. A method according to claim 1, characterized in that the electrical terminal is formed by said work piece (7).

13. A method according to claim 1, characterized in that the electrical terminal is formed by a nozzle portion (4) of said plasma forming device (1).

14. A method according to claim 1, characterized in that said plasma flow is constricted.

15. A method of brazing with the use of a plasma forming device (1) having a non-consumable electrode (2), comprising the following steps of operation:

supplying a first gas to said plasma forming device (1);

forming a plasma flow of said first gas by applying a voltage between said electrode (2) and an electrical terminal (4,7);

directing said plasma flow towards a work piece (7);

providing braze material (10) to be melted by said plasma flow; and supplying a second gas and thereby shielding said plasma flow from the surrounding atmosphere, characterized in that said second gas comprises a principal inert component including at least argon and in a minor amount an active component.

16. A method according to any one of the preceding claims, characterized in that said principal inert component includes a gas mixture of argon and helium.

17. A method according to claim 16, characterized in that said gas mixture comprises 30 to 90% by volume of helium and 10 to 70% by volume of argon.

18. A method according to claim 17, characterized in that said gas mixture comprises 55 to 65% by volume of helium and 35 to 45% by volume of argon.

* * * * *

UNITED STATES PATENT AND TRADEMARK OFFICE
CERTIFICATE OF CORRECTION

PATENT NO.    : 6,198,068 B1
DATED         : March 6, 2001
INVENTOR(S)   : Lindstrom Page 1 of 1

It is certified that error appears in the above-identified patent and that said Letters Patent is hereby corrected as shown below:

<u>Column 1,</u>
Line 2, insert as shown on the following page:

-- TECHNICAL FIELD OF THE INVENTION AND PRIOR ART

The present invention refers to a method of brazing with the use of a plasma forming device having a non-consumable electrode according to the precharacterizing portion of claims 1 and 4.

Modern car manufacturing requires the production of joints of cosmetic appearance in areas of the car where visual impact is important. Such areas include the joining of the roof to the side panels, the front and rear panels to the side panels etc. Such parts of the car are made of relatively thin steel plates, which frequently have a thin surface layer of zinc for the purpose of corrosion protection.

It is known to provide such joints by means of MIG-welding. However, due to the high temperatures existing during the MIG-welding process, it is difficult to maintain the thin zinc layer. Spatter particles, having a high heat content, may damage the zinc layer. Due to the high temperatures the zinc layer on the rear face of the steel plate may vaporize and thus disappear. Another disadvantage is that the MIG-weld seam is relatively hard and therefor requires rough grinding to provide a smooth joint. The surface layer is also frequently damaged by such rough grinding. It is also known to hide such joints by plastic trim. However, for reasons of health and safety, and the fact that modern paint systems for cars require cure temperatures of 180° C or more such plastic covers are not preferred. --

Signed and Sealed this

Twenty-third Day of April, 2002

*Attest:*

*Attesting Officer*

JAMES E. ROGAN
*Director of the United States Patent and Trademark Office*